United States Patent [19]

Watanabe et al.

[11] Patent Number: 5,017,442
[45] Date of Patent: May 21, 1991

[54] COILED LITHIUM BATTERY

[75] Inventors: Osamu Watanabe, Toyonaka; Osamu Kajii, Kashiwara; Toshiyuki Edamoto; Tomio Kitamura, both of Suita; Kaoru Hisatomi, Takatsuki; Hiroshi Yoshida, Suita; Yoshiki Somatomo, Osaka, all of Japan

[73] Assignee: Hitachi Maxell, Ltd., Osaka, Japan

[21] Appl. No.: 324,737

[22] Filed: Mar. 17, 1989

[30] Foreign Application Priority Data

Mar. 19, 1988 [JP] Japan .................................. 63-66301
Mar. 19, 1988 [JP] Japan .................................. 63-66302
Mar. 19, 1988 [JP] Japan .................................. 63-66303

[51] Int. Cl.⁵ .............................................. H01M 2/02
[52] U.S. Cl. ...................................... 429/94; 424/241
[58] Field of Search ................................... 429/94, 241

[56] References Cited

U.S. PATENT DOCUMENTS 2,005,760  6/1935  Southwell et al. .
2,337,303 12/1943  Spraragen .
4,255,500  3/1981  Hooke .
4,487,817 12/1984  Willems et al. .......................... 429/27
4,507,368  3/1985  Hashimoto .......................... 429/94 X
4,550,064 10/1985  Yen et al. ................................ 429/94
4,622,277 11/1986  Bedder et al. .......................... 429/94
4,783,384 11/1988  Van Beek et al. .............. 429/241 X

FOREIGN PATENT DOCUMENTS 2184594  6/1987  United Kingdom .

Primary Examiner—Stephen J. Kalafut
Attorney, Agent, or Firm—Birch, Stewart, Kolasch & Birch

[57] ABSTRACT

In a coil type lithium battery comprising a coil electrode body formed by winding a strip like negative electrode plate of lithium or lithium alloy and strip like positive electrode about a separator, the entire outer cylindrical surface of the coil of the electrode body is covered with an insulating film to prevent internal short circuiting of the battery.

4 Claims, 3 Drawing Sheets

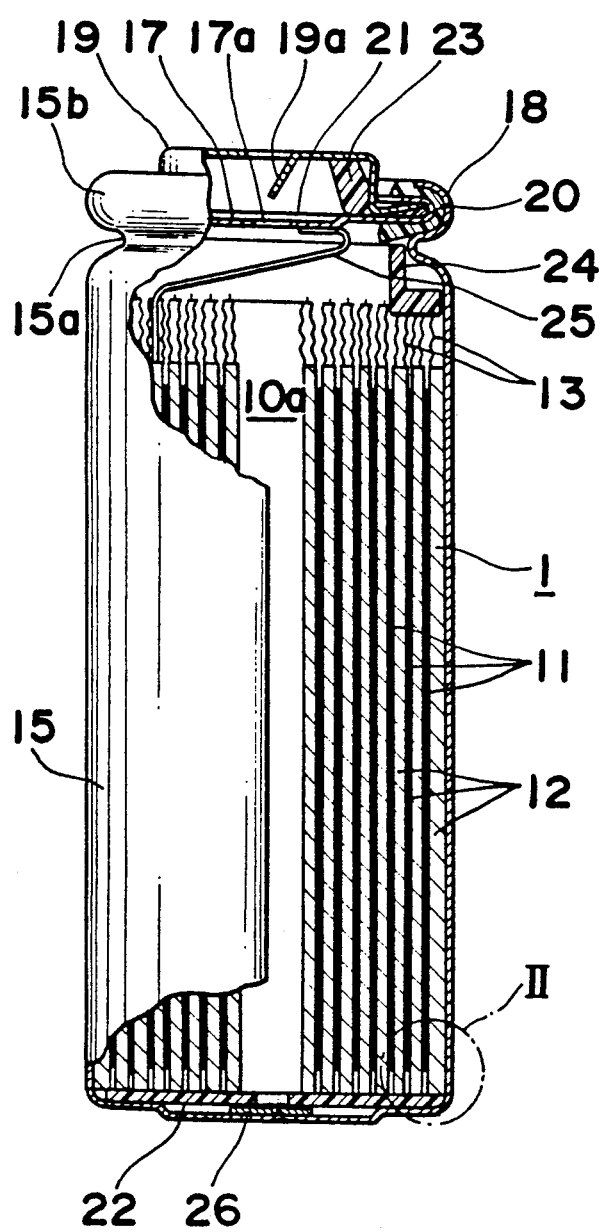
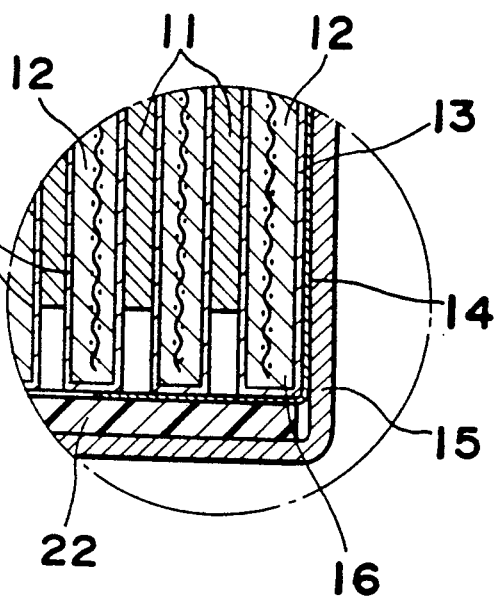
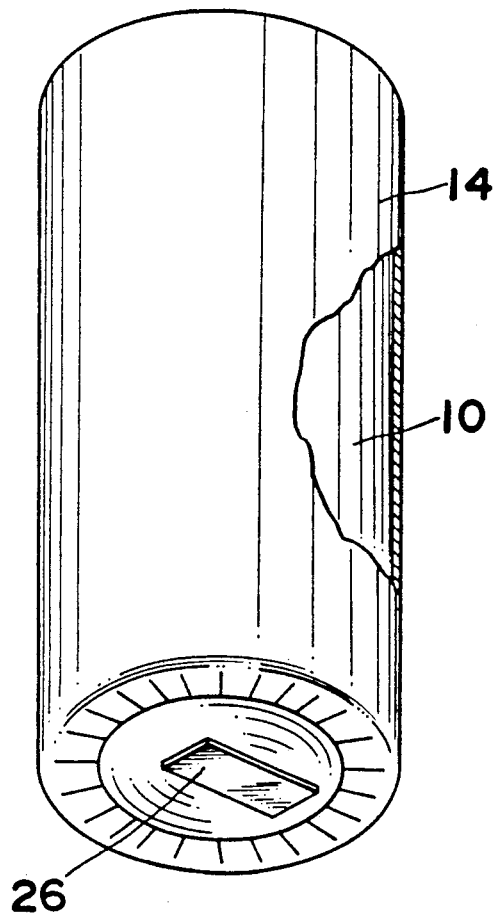

COILED LITHIUM BATTERY

BACKGROUND OF THE INVENTION

1. Field of the Invention

The present invention relates to a lithium battery, and more particularly to a lithium primary battery having coiled electrode members for use in supplying high current.

2. Description of the Prior Art

In a conventional coiled type lithium battery (FIG. 1), an electrode body of a cylindrical shape of the battery is formed in such a manner that a negative electrode plate 1 made of a strip sheet of lithium or lithium alloy and a positive electrode 2 made of metal charge collecting mesh holding a positive electrode agent are laminated through a separator 3 made of a non woven cloth, such as polypropylene fibers, and are coiled in a roll.

Moreover, in order to avoid collapse of the roll of the electrode members, the outer end part of the separator 3, wound around the outer cylindrical surface of the electrode body, is adapted to contact with the inner cylindrical surface of a negative electrode can except for a portion of an adhesive tape wound around the central portion of the outer cylindrical surface of the roll of the electrode body. At the inner central portion of the roll of the electrode body, namely at the beginning of the winding of the electrode body, a rolled portion 3a of only the separator 3 is formed and the stripe-like positive electrode 2 is disposed outside of the rolled portion 3a and the strip-like negative electrode 1 is disposed outside of positive electrode 2 through the separator 3.

The inner end 1a of the strip-like negative electrode plate 1 ends beyond the inner end 2a of the positive electrode plate 2 toward the inner portion of the roll of the electrode body in order to prevent slip of the respective members of the electrode body and to facilitate winding of the electrode body when the electrode body is wound by a winding machine by clamping the inner end of the separator 3 by the rotation spindle of the machine. Accordingly, as shown by 3a, only the separator 3 is rolled along some length (normally 90° to 180°) from the inner end 1a of the strip-like negative electrode plate 1.

As the collecting mesh of the positive electrode, there is used an expanded metal plate made of stainless steel which metal plate is cut by a number of slits directed in one direction and the metal plate is expanded in a direction perpendicular to the slit to open the slits. Conventionally, the stripe-like positive electrode plate is formed in such a manner that the expanded metal is sandwiched by positive electrode agent sheets made of a positive active agent, electrically conductive powder and a binder with the positive electrode agent sheets bonded to the expanded metal by a rolling machine.

However, according to recent developments in the wide field of use of the battery, there are increasing cases of wrong use of the battery of this kind such that the battery, despite the fact that the battery is a primary battery, is erroneously subjected to charging or forced discharging by an external power source. An example of forced discharging, which occurs many times, is that one or more old batteries, which are already used and the discharging capacity thereof is depleted or small, are connected with one or more new batteries of which the discharging capacity is plentiful. In this case, if the battery of which the discharging capacity is depleted is forced to be discharged, the battery is loaded with a minus voltage by the current supplied from the other healthy battery.

In the conventional coiled type lithium battery, if such error occurs, the battery is apt to generate heat due to an internal short circuit and there are many cases of the batteries catching fire.

The holding of the positive electrode agent in the positive electrode is done mainly by bonding of the positive electrode mix, carried on the expanded metal on both sides of the slit. However, in case of expanded metal, if the slit is opened too wide, the expanded metal is apt to be cut off. Therefore, in general, the opening rate of the expanded metal is small, about less than 70%, whereby the bonding areas are insufficient, the sufficient holding force can not be obtained and therefore there is a problem that the positive electrode mix can be easily separated from the expanded metal at the time of formation of the coiled electrode body.

In case the pressing force of the positive electrode agent sheet is increased for increasing the bonding force of the positive electrode agent and electric collecting ability, there is such a problem that rigid deformation of and cut-off in the expanded metal sheet easily occur. There is a further disadvantage that since the edge of the opened slit and the cut off edge are acute in the expanded metal sheet, the separator is apt to be damaged.

It has also been discovered that when the lithium batteries are subjected to work using relatively large current, the batteries generate a lot of heat and the temperature of the battery becomes higher at the central portion, and the insulation layer 3a is molten, whereby an internal short circuit occurs at the inner end 1a of the negative electrode plate 1 and the inner end 2a of the positive electrode 2 and a further large amount of current flows there with the generation of further heat, causing the lithium and lithium alloy to become molten resulting in burning or an explosion of the battery.

SUMMARY OF THE INVENTION

An essential object of the present invention is to provide a coiled type lithium battery in which the internal short circuiting is diminished and has a high degree of safety.

A further object of the present invention is to provide a coiled type lithium battery having a stripe-like positive electrode in which the positive electrode mix is not easily separated and has a good capability of collecting electric charge.

In order to accomplish the above objects of the present invention, the technical aspect of generation of the inner short circuit of the conventional lithium battery when the battery was erroneously used, has been studied. As a result of, these studies, it has been discovered that needle like or acicular crystal metal lithium is deposited during the process of the charging and discharging of the battery, in particular, lithium is deposited at the interface between the negative can and coil electrode body which breaks the outermost separator and internal short circuiting occurs, whereby a large current flows in the lithium at the short, circuit portion and a large amount of heat is generated, resulting in melting of lithium, thereby causing an over reaction to be generated with a further large amount of heat.

In order to eliminate the internal short circuiting in the lithium battery, according to the present invention, there is provided a coil type lithium battery comprising a coil electrode body formed by winding a stripe-like negative electrode plate of lithium or lithium alloy and strip-like positive electrode with an intervening separator characterized in that at least the entire outer cylindrical surface of the coil of the electrode body is covered with an insulating film.

In a preferred embodiment, preferably, the insulation film is one of a poly olefin film, polytetrafluoroethylene film and poly ester film and the peripheral portion of the bottom of the electrode body is further covered by an insulating film.

Moreover in order to prevent burning and exploding of the battery due to heat when the battery is used with a large current as mentioned above, according to the present invention there is provided a coil type lithium battery comprising a coil electrode body formed by winding a strip-like negative electrode plate of lithium or lithium alloy and a strip-like positive electrode plate with a separator in between characterized in that the inner end of the strip-like negative plate is positioned behind the inner end of the strip-like positive electrode plate, with the strip-like negative electrode plate accommodating on its inside of the coil a part of the innermost portion of the strip-like positive electrode plate.

Moreover, in order to accomplish the above objects, according to the present invention, there is provided a coil type lithium battery comprising a coil electrode body formed by winding a stripe-like negative electrode plate of lithium or lithium alloy and a stripe-like positive electrode plate with a separator in between, characterized in that the strip-like positive electrode plate comprises a charge collecting mesh formed by a plane woven mesh woven by a plurality of longitudinal wires and a plurality of lateral wires and a positive electrode mix containing electrode active material held on the charge collecting mesh.

In the preferred embodiment, the plane woven mesh is formed of the wires of 0.05 to 0.10 mm diameter with the wire distance of 0.25 to 1.2 mm and the wires all are bonded together at their cross points by a heating process.

BRIEF EXPLANATION OF THE DRAWINGS

FIG. 3 is a side elevational view of an example of a partially broken coiled type lithium battery according to the present invention, FIG. 4 is an partial enlarged view showing an essential portion of the battery shown in FIG. 3, and FIG. 5 is a perspective view of the battery shown in FIG. 3.

DETAILED DESCRIPTION OF THE PREFERRED EMBODIMENTS

Figure 1:
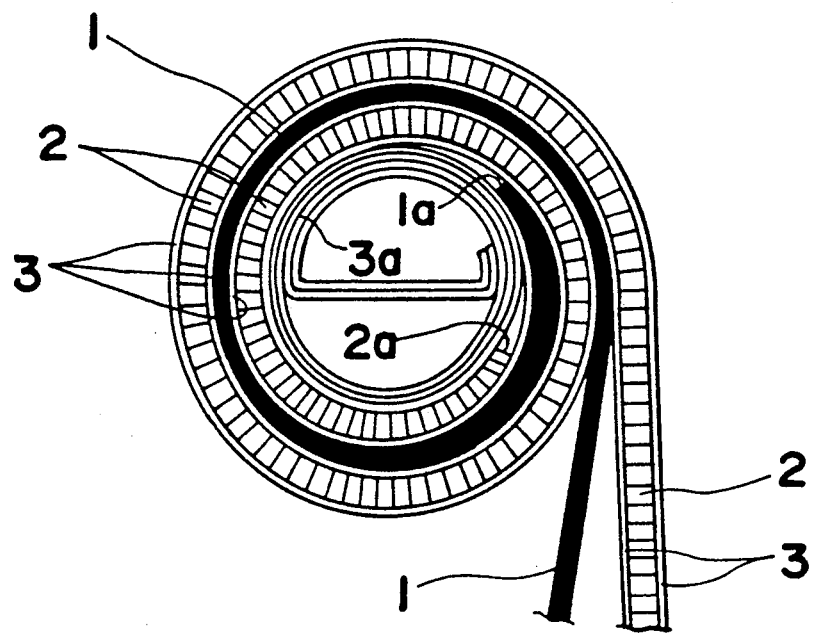
FIG. 1 is a cross sectional view of an electrode body of a conventional coiled type lithium battery.

Referring to FIGS. 2 to 5, a coil electrode body 10 is constructed in such a manner that a stripe-like negative electrode plate 11 of lithium or lithium alloy and a strip-like positive electrode 12, having a positive electrode mix, held on an electric charge collection mesh of metal are laminated and coiled in a roll shape with a separator or insulator 13 therebetween so as to electrically insulate both electrodes 11 and 12. The coiled electrode body 10 has its outer cylindrical surface and a peripheral portion of the bottom surface covered with an insulation film 14. The separator 13 is formed in a bag shape and the positive electrode 12 is enclosed in the bag of a suitable length with room left at the upper portion of the bag.

As the insulation film 14 any suitable material such as selected from polyolefin films, polytetrafluoroethylene film and polyester films may be used. As the insulation film 14, a simple film may be used, however, using an adhesive film having one surface formed as an adhesive layer using silicon adhesives makes the work of covering the coiled electrode body 10 easier. If the insulation film is too thin, the mechanical strength is insufficient and if it is too thick, the capacity of the battery is decreased, therefore, it is desired that the thickness of the insulation film be selected in the range of 50 to 100 $\mu$m.

In the arrangement of the lithium battery mentioned above, even if the battery is subjected to charging or a forcible discharging due to improper use, since the interface between the outer peripheral surface of the coiled electrode body 10 and the inner cylindrical surface of the negative electrode can 15 is insulated by the insulation film 14, crystallization of the needle like crystals of lithium is effectively suppressed and even if the crystallization is generated, breakage of the outermost separator 13 by the needle like crystal can be prevented because of the presence of the further insulation film 14, whereby it is possible to avoid any danger of the internal short circuit in the battery.

In addition, in the battery shown in the embodiment, the lower edge portion of the electrode body 10, where the electric current concentration tends to occur, can be protected by the insulation film 14, so that it is assured to suppress any internal short circuit.

The specific structure of the coiled electrode body 10 is characterized at the beginning of the winding.

Figure 2:
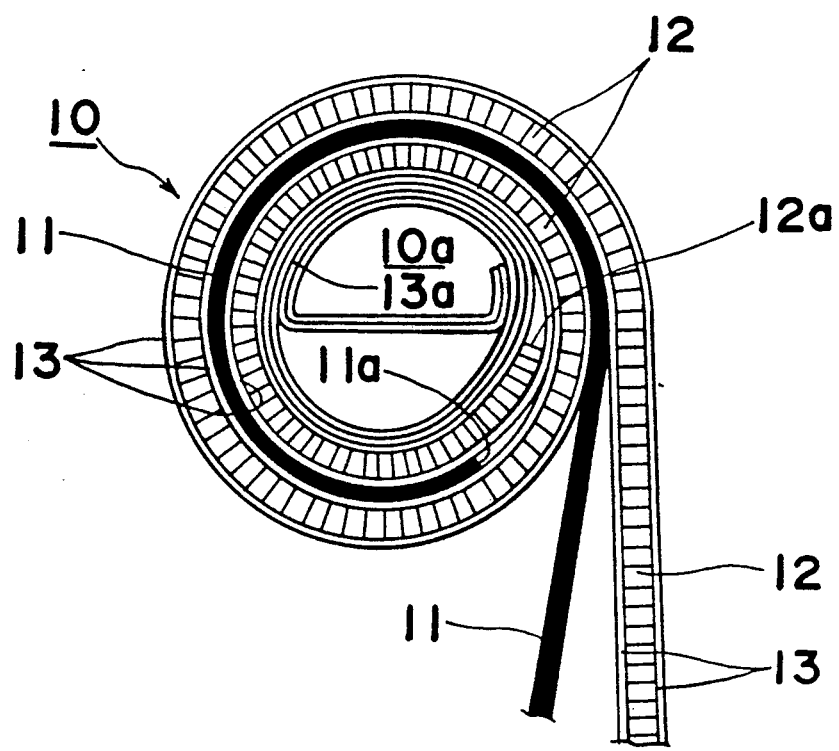
FIG. 2 is a cross sectional view of an example of a coiled type lithium battery according to the present invention.

Namely, as shown in FIG. 2, the innermost portion of the electrode body 10 is constructed by only the coil 13a of the separator 13, the innermost coiled portion of the strip-like positive electrode 12 is wound on the outer side of the coil 13a, moreover, the negative electrode plate 11 is wound outside of the coiled part of the positive electrode 12. The innermost end 11a of the negative electrode plate 11 is ended behind the inner end 12a of the strip-like positive electrode plate 12. Accordingly, the entire coil portion of the negative electrode plate 11 is so arranged that the positive electrode plate 12 is situated inside of the coil portion of the negative electrode plate 11 beginning from the coil end 11a.

In the lithium battery mentioned above, when the battery is used for supplying a large current, even if the coiled portion 13a of the separator 13, which faces to the central hole 10a of the coiled electrode body 10, is made molten by heat at the central portion of the battery, the separator 13 which is situated outside the innermost peripheral portion of the positive electrode 12 can be protected by the strip-like positive electrode 12 and is never molten. Therefore, the inner end 11a of the strip like negative electrode plate 11 can always be separated from both of the strip-like positive electrode plates 12, whereby the an inner short circuit never occurs and burning of the battery and exploding of battery due to melting of the strip-like negative electrode plate 11 can be prevented.

Preferably, the inner end 11a of the negative electrode 11 is positioned in an angular range of from 45° to 360° behind the inner end 12a of the positive electrode plate 12 partly because it is not desired to position the inner end 11a of the negative electrode plate 11 near the inner end 12a of the positive electrode plate 12 since the detrimental effect of the melt of the separator 13 would reach the region near the inner end 12a and partly because if the inner end 11a is positioned more than 360° behind the inner end 12a, the battery capacity would be lowered due to the shortage of the amount of the material of the negative electrode plate 12.

Figure 6:
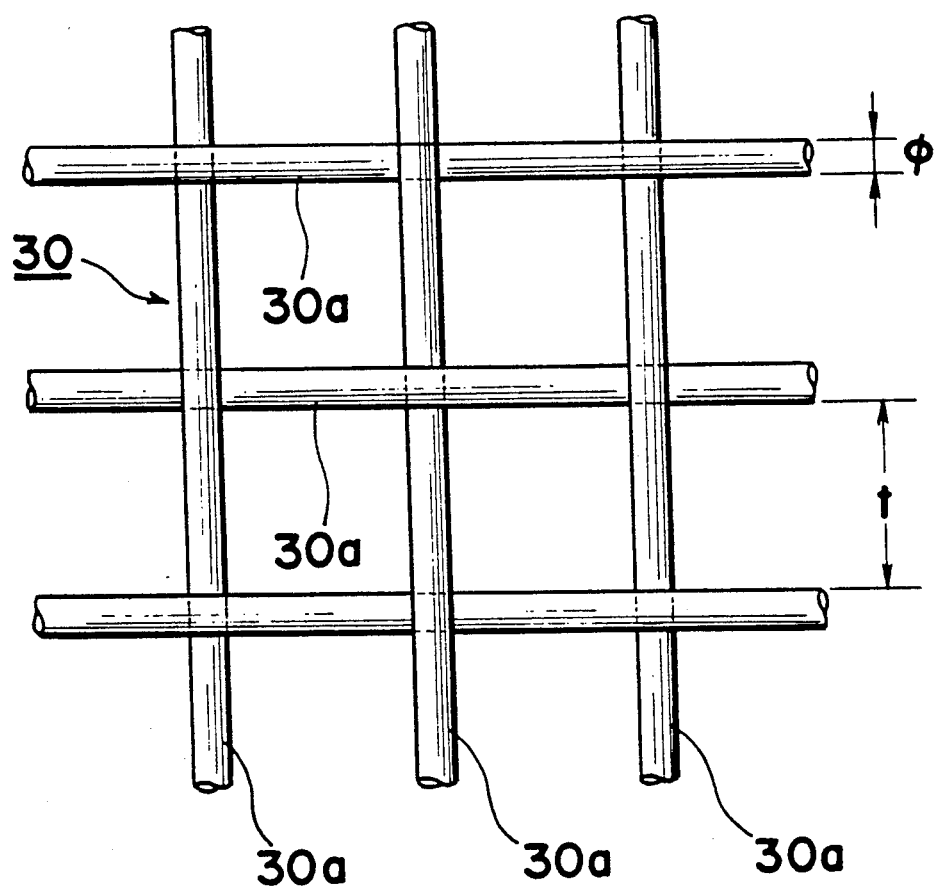

The positive electrode plate 12 is constructed in such a manner that, as shown in FIG. 4, the positive electrode mix 16, consisting of a positive electrode active agent such as manganese dioxide, conductive powder such as carbon black and a binder such as polytetrafluoroethylene is held, to a charge collecting mesh 30 made of plane weave metal mesh formed by weaving metal wires 30a such as stainless steel wires as shown in FIG. 6.

In the coiled lithium battery as mentioned above, since the charge collecting mesh 30 of the positive electrode plate 12 is made of the plane weave metal mesh, the aperture factor can be made large, whereby the bonding areas of the positive electrode mix to the charge collecting mesh 30 through the apertures of the mesh can be made large and therefore, sufficient holding force for holding the positive electrode mix to the mash can be obtained. In addition, since the charge collecting mesh 30 is formed by laminating the metal wires 30a and the positive electrode mix 16 enters the spaces of the crossing parts of the metal wires 30a, the bonding force between the charge collecting mesh 30 and the positive electrode mix 16 can be increased. Therefore, in the process of forming the coil electrode body 10 by winding, separation of the positive electrode mix 16 from the mesh is substantially eliminated, thereby resulting in improving the battery efficiency.

In addition, when the positive electrode mix in the form of a sheet is bonded to the charge collecting mesh 30 using rolling work, even if the rolling pressure is increased, the wires forming the mesh 30 are hard to cut because the wires are easily extensible, accordingly, it is possible to make the bonding of the collecting mesh 30 and the positive electrode mix tight and it is possible to improve the ability of charge collection of the charge collecting mesh. In addition, in the plane weaving, since the peripheral portions of the aperture are smooth, there is no fear of damaging the separator at the charge collecting mesh, and even if the ends of the wires are damaged, the degree of damage is much less than the degree of damage in the conventional expandable metal.

It is suitable to select the aperture density of the charge collector mesh as 70 to 85% so as to satisfy the holding force of the positive electrode mix 16 and the charge collecting ability. In a specific example, it is desired that the diameter ($\phi$) of the respective longitudinal and lateral wires 30a for the mesh shown in FIG. 6 be from 0.05 to 1.2 mm and the distance (t) between two wires from 0.25 to 1.2 mm. If the diameter ($\phi$) is too small and distance (t) is too large, the charge collecting ability becomes insufficient and the mechanical strength of the positive electrode 12 deteriorates. To the contrary, if the distance (t) between the two adjacent wires is too small, the holding force for holding the positive electrode mix becomes insufficient. If the diameter ($\phi$) of the wire is too large, the amount of the positive electrode mix held in the charge collecting mesh is decreased, thereby increasing the battery ability to deteriorates.

As the plane weave metal mesh mentioned above, there may be used such a mesh that the longitudinal and lateral wires 30a are simply woven, however, it is desired to use such a mesh that the respective cross points of the longitudinal and lateral wires are heated at a high temperature so that both wires are welded and electrically connected because such a mesh is superior to the conventional mesh in electron transmission property and charge collecting property.

In order to prepare the positive electrode plate 12, a mix of the positive electrode sheets 12 are rolled on both sides of the charge collecting mesh 30, however, there may be used other methods, for example, to paint the positive electrode mix of a viscous liquid on the charge collecting mesh 30.

Reference numeral 15 denotes a negative can of a cylindrical shape with a bottom, into which the coiled electrode body 10 is installed. The negative can 15 is made of a nickel coated iron plate, having its upper portion narrowed, as indicated by 15a. A sealing plate 17 is made of SUS 430 stainless steel plate in a round disc shape with its central portion opened by a hole 17a. The sealing plate 17 is fitted within the upper portion of the negative can 15 by engaging the upwardly folded peripheral edge portion of the sealing plate 17 in the inside of the bent portion 15b of the upper end portion of the negative can 15 through an insulation packing 18. A positive electrode terminal plate 19 is made of a nickel plated iron plate and shaped in a hat shape by press forming. The positive electrode terminal plate 19 has its central portion formed as a cut blade 19a projected slantingly in a downward direction, with the flanged peripheral edge portion of the positive electrode terminal plate 19 clamped between the folded edge portion o the peripheral portion of the sealing plate 17 through a packing 20 of a ring shape.

An explosion proof film 21 is provided made of titanium about 15 $\mu$m thick. The film 21 is laid on the top surface of the sealing plate 17 with the outer peripheral edge clamped between the sealing plate 17 and the positive electrode terminal plate 19, such that when the inner pressure of the battery rises, the film 21 is expanded upwardly and the film 21 is broken by engagement with the blade 19a so as to exhaust the inner gas in the battery outward, thereby preventing explosion of the battery. A thermal deformable member 23 is provided made of a poly ethylene ring and is mounted in a space between the explosion proof film 21 and the positive electrode terminal plate 19. The thermal deformable member 23 has the capability of preventing an erroneous operation of the explosion proof film 21.

An insulation ring 24 is disposed on the coiled electrode body 10, and an insulation plate 22 is disposed between the lower surface of the coiled electrode body 10 and the inner surface of the negative can 15. The insulation packing 18, the ring shaped packing 20, the insulation ring 24 and the insulation plate 22 are respectively made of molded members of polypropylene or the like.

A positive lead member 25 is made of a strip of stainless steel with its upper end connected with the sealing plate 17 and its lower end connected with the central portion of the positive electrode plate 12 by spot welding, and an intermediate portion of the positive lead member 25 is covered with adhesive tape (not shown) made of teflon processed glass fiber cloth. A negative lead member 26 of a L character shape is provided with the vertical member of the L character shape adhered to the central portion of the negative electrode plate 11 by an adhesive tape (not shown) and its horizontal member spot welded to the inner surface of the bottom of the negative can 15, passing the central hole 10a and the central hole 22a of the insulation plate 22. The negative can 15 contains electrolyte in which a lithium salt is molten in the non aqueous solution.

It is noted that with the battery according to the present invention, a simple sheet separator 13 may be used. In addition various detailed portions of the battery ma be modified.

According to the present invention, since the entire outer surface of the electrode body is covered with an insulation film, even if the battery is erroneously charged or forcibly discharged, the possibility of an inner short circuit is substantially reduced and therefore fire proof and safe coiled lithium batteries can be provided.

Moreover, by using one of the film selected from polyolefin film, and polytetrafluoroethlene film as the insulation film, the insulation and mechanical strength of the insulation film are improved to help prevent the inner short circuit of the lithium battery. By covering the lower peripheral portion of the electrode body in addition to covering the outer surface of the coiled electrode body, the effect of preventing the inner short circuit can be further improved.

Moreover, the inner end of the negative electrode plate made of lithium or lithium alloy is positioned behind the end of the positive electrode plate and the innermost coil portion of the positive electrode plate is situated inside of the coil of the negative electrode plate, therefore, even if heat collection occurs in the central portion of the battery, an inner short circuit will not occur, whereby according to the present invention, it is possible to provide coiled type lithium batteries which are safe and without fear of burning.

Moreover, since the plane weave mesh is used as the charge collecting mesh of the positive electrode, it is possible to increase the holding force for holding the positive electrode mix because of the increment of the aperture density of the mesh, whereby separation of the positive electrode mix is difficult. Also, it is possible to increase the bonding force of the positive electrode mix by rolling the sheet of the positive electrode mix at the time of the production of the positive electrode plate, whereby it is possible to enhance the charge collecting capability and to decrease damage to the separator by the charge collecting mesh, so that it is possible to provide the coil type lithium batteries of high reliability.

In addition, in the case of using such a plane weave metal mesh, the diameter of the wire is from 0.05 to 0.10 mm and the wire distance is 0.25 to 1.2 mm, so there can be obtained good properties of the holding force of the positive electrode mix and the mechanical strength with a suitable aperture density. It is also possible to enhance the charge collecting property by using the plane weave metal mesh in which the longitudinal wire and lateral wire are welded and joined at their respective crossing points.

PREFERRED EMBODIMENTS

EXAMPLES

Example 1 (First Embodiment of the Invention)

The positive lead member made of a stainless steel plate was bonded to the central portion in the longitudinal direction of the strip-like positive electrode plate (190 mm $\times$ 30 mm $\times$ 0.4 mm) made of the charge collecting mesh made of stainless steel 316 on which positive electrode mix comprising manganese dioxide of 10 parts by weight, carbon black of 1 part by weight and polytetrafluoroethylene of 0.2 parts by weight was held. The positive electrode plate was enclosed in the separator of a bag shape made of non woven cloth of polypropylene fibers and the opening edge of the bag was sealed by thermal bonding with the separator elongated 15 mm than the positive electrode so that the inner end of the separator was situated at a position higher than the inner end of the positive electrode plate.

The negative lead member made of nickel was attached to the central portion in the longitudinal direction of the strip-like negative electrode plate (190 mm $\times$ 28 mm $\times$ 0.17 mm) made of lithium by the insulation adhesive tape the base of which is made of teflon processed glass fiber cloth. The intermediate portion of the positive lead member was also covered by the adhesive tape as mentioned above.

Subsequently, the inner end portion of the separator enclosing the strip-like positive electrode plate was fixed to the spindle of a winding machine, locating the strip-like negative electrode plate its outside, then the spindle was rotated so that the coil type electrode body was produced. The entire outer cylindrical surface of the coil type electrode body and the periphery of the bottom of the electrode body were covered by the adhesive insulation film made of polypropylene film of 50 $\mu$m thick with its one side coated with adhesive layer of silicone adhesives of 30 $\mu$m thick.

The coil type electrode body was installed in the iron negative can plated by nickel with the insulation plate and insulation ring each made of polypropylene and the horizontal member of the negative lead member of L shape was was spot welded to the bottom of the negative can. Subsequently, the top portion of the negative can was formed as the narrowed portion then the electrolyte of 1:1 mixed solution of propylene carbonate and 1·2 dimethoxyethane with lithium perchlorate solved with the concentration of 0.5 mol/l was injected.

The iron positive terminal plate coated by nickel, the titanium explosion proof film of 15 $\mu$m thick and the sealing plate of SUS 430 are laminated through the round shape thermal deformable member made of polyethylene and the ring shape packing of polypropylene, with the peripheral edge thereof fitted by the insulation packing made of polypropylene to form the sealing body in which the above members are integrally combined in one body.

Subsequently, the positive lead member is spot welded to the bottom face of the sealing plate, then the sealing body is mounted in the negative can above the narrowed portion, thereafter the opening edge of the negative can was fastened, forming the curved portion, whereby the negative can was sealed and prepared the coil type lithium battery as shown in FIGS. 2 to 5.

Comparative Example

As a comparative example, a coil type lithium batter was prepared in a similar manner as the example 1 except that the coil electrode body was not covered by the insulation film.

50 batteries of the example 1 and 30 batteries of the comparative example were subjected to the test in such a manner that the respective batteries were put in the forced discharging condition by causing the polarities of the batteries to be reversed to −2.5 volts using stabilized D>C power source, and they were put for one day and the number of the batteries which fired was counted. The result is shown in the table 1.

TABLE 1

|  | $N_F$ | $N_T$ |
|---|---|---|
| Example 1 | 0 | 50 |
| comparative example | 2 | 30 |

In the table 1, $N_F$ is the number of fired battery and $N_T$ is the number of the tested batteries.

Examples 2 and 3 (Examples of a Second Embodiment)

The coil type lithium battery was prepared in the same manner as shown in the example 1 except that:

the positive electrode mix comprised manganese dioxide, carbon black powder and fluorine resin binder;

the inner end of the strip-like negative electrode plate was ended behind the inner end of the strip-like positive electrode plate with the angles shown in the table 2;

the coil type electrode body was not coated by the adhesive insulation layer;

in the electrolyte, the concentration of the lithium perchrolate was 1 mol/l.

Comparative Examples 1 to 3

Coil type lithium batteries were prepared in the same manner as the example 2 except that the inner end of the strip-like negative electrode was ended at the same position of the inner end of the strip-like positive electrode plate or projected therefrom forward with length shown in the table 2.

30 examples 2 and 3 and 30 comparative examples 1, 2 and 3 were tested in such a manner that the positive cap and negative can of each battery was connected through a load of 1 mΩ (miliohm) and put for one day. After one day, the presence and absence of the melt of the stripe-like negative electrode plate due to the internal short circuit was checked by breaking the batteries. The result of the inspection is shown in the table 2. It is noted that the presence and absence of the melt of the strip-like negative electrode plate was detected by the presence and absence of the round ball like portion showing the trace of the presence of melt in the negative electrode plate lithium.

TABLE 2

|  | position of the end of the negative electrode plate from end of the positive electrode plate | melt of negative electrode plate (number/30) |
|---|---|---|
| example 2 | 90° behind | 0 |
| example 3 | 45° behind | 0 |
| comparative example 1 | 0° | 6 |
| comparative example 2 | 90° forward | 18 |
| comparative example 3 | 180° forward | 20 |

Example 4 (Example of a Third Embodiment)

The charge collecting mesh was prepared in such a manner that a plane weaving mesh using SUS 316 wires of 0.065 mm diameter with the wire distance of 0.57 mm and aperture rate of 80% was sintered in nitrogen atmosphere to bond the longitudinal and lateral wires at their cross points.

The stripe-like positive electrode plate (190 mm×30 mm×0.4 mm) were prepared in such a manner that positive electrode mix sheets comprising manganese dioxide of 10 parts by weight, carbon black of 1 part by weight and polytetrafluoroethylene of 0.2 parts by weight were pressedly adhered to both side of the charge collecting mesh and the positive lead member made of a stainless steel plate was bonded to the central portion in the longitudinal direction of the charge collecting mesh mentioned above by spot welding.

The positive electrode plate was enclosed in the separator of a bag shape made of non woven cloth of polypropylene fibers and the opening edge of the bag was sealed by thermal bonding with the separator elongated 15 mm than the positive electrode so that the inner end of the separator was situated at a position higher than the inner end of the positive electrode plate.

The negative lead member made of nickel was attached to the central portion in the longitudinal direction of the strip-like negative electrode plate (190 mm×28 mm×0.17 mm) made of lithium by the insulation adhesive tape the base of which is made of teflon processed glass fiber cloth. The intermediate portion of the positive lead member was also covered by the adhesive tape as mentioned above.

Subsequently, the inner end portion of the separator enclosing the strip-like positive electrode plate was fixed to the spindle of a winding machine, locating the strip-like negative electrode plate its outside, then the spindle was rotated so that the coil type electrode body was produced.

The coil type electrode body was installed in the iron negative can plated by nickel with the insulation plate and insulation ring each made of polypropylene and the horizontal member of the negative lead member of L shape was spot welded to the bottom of the negative can. Subsequently, the top portion of the negative can was formed as the narrowed portion then the electrolyte of 1:1 mixed solution of propylene carbonate and 1·2 dimethoxyethane with lithium perchlorate solved with the concentration of 1 mol/l was injected.

The iron positive terminal plate coated by nickel, the titanium explosion proof film of 15 μm thick and the sealing plate of SUS 430 are laminated through the round shape thermal deformable member made of polyethylene and the ring shape packing of polypropylene, with the peripheral edge thereof fitted by the insulation packing made of polypropylene to form the sealing body in which the above members are integrally combined in one body.

Subsequently, the positive lead member is spot welded to the bottom face of the sealing plate, then the sealing body is mounted in the negative can above the narrowed portion, thereafter the opening edge of the negative can was fastened, forming the curved portion, whereby the negative can was sealed and prepared the coil type lithium battery as shown in FIGS. 2 to 5.

EXAMPLE 5

The coil type lithium battery was prepared in the same manner as the example 4 except that the longitudinal and lateral wires were not bonded, Comparative Example 4

The coil type lithium battery was prepared in the same manner as the example 4 except that the charge collecting mesh is formed by an expand metal of SUS 304 with the aperture rate of 67% in pace of the plane weaving mesh.

The batteries of the examples 4 and 5 and the comparative example 4 were subjected intermittent discharge test and measured in terms of the internal resistance and the number of discharging until the discharge voltage falls to 1.3 volts. The result of the measurement is shown in the table 3.

TABLE 3

|  | internal resistance (ohm) | number of pulse dischargeable times |
| --- | --- | --- |
| example 4 | 0.4 | 1.100 |
| example 5 | 0.2 | 1,000 |
| comparative Ex. 4 | 0.5 | 950 |

From the result of the test shown in the table 3, it is understood that the number of the pulse dischargeable times of the batteries of the examples 4 an 5 increases than that of the comparative example 4 in which the expand metal is used as the charge collecting mesh because the holding force for holding the positive electrode mix is great and the removal of the positive electrode mix is not easy and therefore, the batteries of the examples 4 and 5 have good ability. In particular, it is understood that the battery of the example 1 in which the longitudinal and lateral wires are bonded at the cross points is low in terms of the internal resistance and is great in terms of the number of the dischargeable times.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A coil type lithium battery having a coil electrode body comprising a strip-like negative electrode plate of lithium or lithium alloy, a strip-like positive electrode, a separator interposed between said negative electrode plate and said positive electrode, and an insulating film over the entire outer cylindrical surface of said coiled electrode body extending onto a bottom surface of said electrode body inclusive of a peripheral, lower edge portion thereof.

2. The battery according to claim 1, wherein said insulating film is selected from one member of the group consisting of a polyolefin film, polytetrafluoroethylene film and a polyester film.

3. A coil type lithium battery having a coil electrode body comprising a strip-like negative electrode plate of lithium or lithium alloy, a strip-like positive electrode plate, and a separator interposed therebetween, said strip-like positive electrode plate consisting of a charge collecting plane woven mesh of a plurality of longitudinal wires and a plurality of lateral wires and a positive electrode mix containing electrode active material held on said charge collecting mesh, said longitudinal wires and lateral wires heat bonded together at their crossing points.

4. The battery according to claim 3, wherein said plane woven mesh is formed of wires of from 0.05 to 0.10 mm in diameter, with a distance between said wires of from 0.25 to 1.2 mm.

* * * * *